United States Patent
Ludlow et al.

(10) Patent No.: US 10,801,649 B2
(45) Date of Patent: Oct. 13, 2020

(54) FUEL TUBINGS AND METHODS FOR MAKING AND USING SAME

(71) Applicant: Saint-Gobain Performance Plastics Corporation, Solon, OH (US)

(72) Inventors: James Ludlow, Medina, OH (US); Kevin M. McCauley, Akron, OH (US)

(73) Assignee: Saint-Gobain Performance Plastics Corporation, Solon, OH (US)

( * ) Notice: Subject to any disclaimer, the term of this patent is extended or adjusted under 35 U.S.C. 154(b) by 25 days.

(21) Appl. No.: 16/146,957

(22) Filed: Sep. 28, 2018

(65) Prior Publication Data

US 2019/0093796 A1    Mar. 28, 2019

Related U.S. Application Data

(60) Provisional application No. 62/565,006, filed on Sep. 28, 2017.

(51) Int. Cl.
*F16L 11/04* (2006.01)
*B32B 1/08* (2006.01)
(Continued)

(52) U.S. Cl.
CPC ............. *F16L 11/04* (2013.01); *B32B 1/08* (2013.01); *B32B 27/08* (2013.01); *B32B 27/16* (2013.01);
(Continued)

(58) Field of Classification Search
CPC ....... F16L 11/04; F16L 2011/047; B32B 1/08; B32B 27/08; B32B 27/16; B32B 2597/00
(Continued)

(56) References Cited

U.S. PATENT DOCUMENTS

| 3,624,045 A | 11/1971 | Stivers |
| 4,101,699 A | 7/1978 | Stine |

(Continued)

FOREIGN PATENT DOCUMENTS

| WO | 03/008011 A1 | 1/2003 |
| WO | 03/020501 A1 | 3/2003 |

OTHER PUBLICATIONS

A. Taguet et al., "Crosslinking of Vinylidine Fluoride-Containing Fluoropolymers," Advances in Polymer Science, Springer Verlag, 184, 127-211 (2005).
(Continued)

*Primary Examiner* — Craig M Schneider
*Assistant Examiner* — David R Deal
(74) *Attorney, Agent, or Firm* — McDonnell Boehnen Hulbert & Berghoff LLP

(57) ABSTRACT

The present disclosure relates to multi-layered tubings that are fuel resistant and resistant to delamination. In one aspect, the disclosure provides a length of tubing having an annular cross-section including an annular fluoropolymer layer formed from at least 75 wt % fluoropolymer (e.g., at least 75 wt % of a PVDF polymer), the fluoropolymer layer having an outer surface and an inner surface; and disposed about the fluoropolymer layer, an annular thermoplastic layer formed from at least 75 wt % thermoplastic (e.g., thermoplastic polyurethane, thermoplastic polyamide and/or thermoplastic polyester), the thermoplastic polyurethane layer having an inner surface in contact with the outer surface of the fluoropolymer layer and an outer surface, wherein the fluoropolymer layer is covalently bound to the thermoplastic polyurethane layer, for example, by electron beam treatment.

22 Claims, 6 Drawing Sheets

(51) Int. Cl.
*B32B 27/16* (2006.01)
*B32B 27/08* (2006.01)

(52) U.S. Cl.
CPC ..... *B32B 2597/00* (2013.01); *F16L 2011/047* (2013.01)

(58) Field of Classification Search
USPC .......................................................... 138/137
See application file for complete search history.

(56) References Cited

U.S. PATENT DOCUMENTS

| | | | |
|---|---|---|---|
| 4,935,467 A | 6/1990 | Cheng | |
| 5,538,510 A * | 7/1996 | Fontirroche | A61M 25/0009 604/265 |
| 6,165,166 A * | 12/2000 | Samuelson | A61M 25/0009 604/524 |
| 6,652,943 B2 | 11/2003 | Tukachinsky | |
| 7,514,480 B2 | 4/2009 | Mekhilef | |
| 7,776,428 B2 | 8/2010 | Swei | |
| 8,092,881 B2 | 1/2012 | Garver | |
| 2005/0005989 A1 | 1/2005 | Roloff | |
| 2008/0248226 A1 | 10/2008 | Simon | |
| 2009/0169790 A1 | 7/2009 | Nadeau et al. | |
| 2011/0186329 A1 | 8/2011 | Makal | |
| 2011/0241262 A1 | 10/2011 | Siddhamalli | |
| 2019/0091962 A1 * | 3/2019 | Kurumiya | B32B 27/20 |
| 2019/0284451 A1 * | 9/2019 | Werness | C08L 33/08 |

OTHER PUBLICATIONS

International Search Report and Written Opinion in PCT/US2018/053551, dated Apr. 12, 2019.

* cited by examiner

FUEL TUBINGS AND METHODS FOR MAKING AND USING SAME

CROSS-REFERENCE TO RELATED APPLICATIONS

This application claims the benefit of priority of U.S. Provisional Patent Application No. 62/565,006, filed Sep. 28, 2017, which is hereby incorporated herein by reference in its entirety.

BACKGROUND OF THE DISCLOSURE

1. Field of the Disclosure

The present disclosure relates generally to polymer-based tubing, suitable, for example, for conducting hydrocarbon fuels. The present disclosure relates more particularly to multi-layered tubings that are fuel resistant and resistant to delamination.

2. Technical Background

Multilayered or laminated rubber tubings are known to be useful to serve as a fuel transporting hose for an automotive fuel feed line into a vehicle reservoir. Such tubings are generally required to have a low permeability to fuel vapor, so as to reduce the amount of hydrocarbon vapor released to the environment. The United States Environmental Protection Agency sets certain regulations that limit the release of hydrocarbons into the environment. And the State of California, through the California Air Resources Board (CARB), has taken an even more stringent position, requiring a maximum permeation rate of 15 $g/m^2/day$, with the test involves a 1,000 hour pre-test soak step. In addition, the test is performed on circulating fuel, measuring the capture of hydrocarbons permeating through the tube wall at a \ test temperature of 40° C. The marketplace does not want to be in a position of having to use one tube/hose for California and another for the rest of the US, so it is highly desirable that fuel tubings meet the most rigorous requirement of CARB.

To meet these strict evaporative emission standards, barrier layers are often used in fuel tubing. Thermoplastic fluoropolymers are an especially attractive material for use as barrier layers. They have a unique combination of properties, such as high thermal stability, chemical inertness and non-stick release properties. But thermoplastic fluoropolymers are expensive in comparison to many other polymers, and often do not provide the necessary strength and flexibility to a tubing. Accordingly; tubings are often formed as multilayer structures, in which one or more additional polymer layers can contribute theft own properties and advantages such as, for example, low density, elasticity, sealability, scratch resistance and the like. Co-extrusion is often used to form such multilayer tubings.

Maintaining adhesion between the layers under application conditions can be a challenge, particularly with fluoropolymer based liners, and prolonged exposure of the tubing to fuel can cause the layers to delaminate. Many fluoropolymers are non-polar and have very low surface energy (non-wetting surface). Interlayer wetting can be achieved by melting the fluoropolymer; however, upon solidifying, layers of the resulting multilayer product can be easily separated (delaminated). In most cases, interlayer adhesion is insufficient unless the fluoropolymer is chemically functionalized or its surface is chemically modified by special treatment techniques; which are both costly and complex. If the objective is to produce a multilayer article with a very thin fluoropolymer layer, modification of the interlayer surface can become a very costly or even impossible operation. Chemically functionalized fluoropolymers are expensive, and they are designed for adhesion to particular polymers such as nylons, and not necessarily to thermoplastic polyurethanes.

What is needed are improved multilayer fuel tubing that are not only chemically resistant to hydrocarbon fuels and have very low permeability to hydrocarbon fuels, but also resistant to delamination.

SUMMARY OF THE DISCLOSURE

In one aspect, the present disclosure provides a length of tubing having an annular cross-section, the annular cross-section having an inner surface and an outer surface, the annular cross-section comprising
- an annular fluoropolymer layer formed from at least 75 wt % fluoropolymer (e.g., at least 75 wt % of a PVDF polymer), the fluoropolymer layer having an outer surface and an inner surface; and
- disposed about the fluoropolymer layer, an annular thermoplastic layer formed from at least 75 wt % thermoplastic (e.g., thermoplastic polyurethane, thermoplastic polyester, and/or thermoplastic polyamide), the thermoplastic layer having an inner surface in contact with the outer surface of the fluoropolymer layer and an outer surface,
- wherein the fluoropolymer layer is covalently bound to the thermoplastic layer.

In another aspect, the disclosure provides a method for making a length of flexible tubing, e.g., as described above, comprising
- providing a length of tubing having an annular cross-section, the annular cross-section having an inner surface and an outer surface, the annular cross-section comprising:
- an annular fluoropolymer layer formed from at least 75 wt % fluoropolymer (e.g., at least 75 wt % of a PVDF polymer), the fluoropolymer layer having an outer surface and an inner surface; and
- disposed about the annular fluoropolymer layer, an annular polyurethane layer formed from at least 75 wt % thermoplastic (e.g., thermoplastic polyurethane, thermoplastic polyester, and/or thermoplastic polyamide), the thermoplastic layer having an inner surface in contact with the outer surface of the fluoropolymer layer; and
- treating the length of tubing with an electron beam.

In another aspect, the present disclosure provides a length of tubing made according to a method as described herein.

In another aspect, the present disclosure provides a method for transporting a hydrocarbon fuel, the method including
- providing a length of tubing as described herein; and
- flowing the hydrocarbon fuel through the flexible tubing from a first end to a second end thereof.

In another aspect, the present disclosure provides a fuel-powered device comprising a fuel tank, a fuel-powered engine, and a tubing of the present disclosure fluidly connecting the fuel tank with the fuel-powered engine (i.e., configured so as to transmit fuel from the fuel tank to the engine).

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

Figure 1:
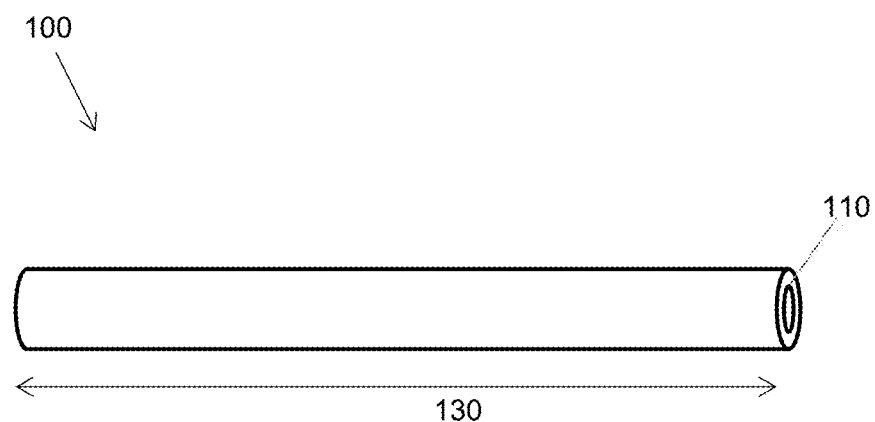
FIG. 1 is a side schematic view of a length of tubing according to one embodiment of the disclosure.

As described above, the present inventors have noted that conventional multilayer flexible tubing can suffer undesirable delamination when being used for long amounts of time with hydrocarbon fuels. The present inventors have unexpectedly determined that a modification of the polymer material of the tubing can provide a flexible tubing that has a high resistance to delamination, but retains a high resistance to hydrocarbon fuels and to permeance of fuel vapors.

Accordingly, one aspect of the disclosure is a length of flexible tubing having an annular cross-section, the annular cross-section having an inner surface and an outer surface. Such a tubing is shown in schematic perspective view in FIG. 1, and in schematic cross-sectional view in FIG. 2. Flexible tubing 100 includes has an annular cross-section 110 (shown in detail in FIG. 2), which has an inner surface 112, an outer surface 114, an inner diameter 116 and an outer diameter 118. The inner diameter and the outer diameter define a wall thickness 120 of the tubing. Flexible tubing 100 also has a length 130.

Flexible tubing 100 is shown as being circular in overall shape. Of course, the person of ordinary skill in the art will appreciate that the tubing can be fabricated in other overall shapes, e.g., oval, elliptical, or polygonal. Similarly, while flexible tubing 100 is shown as having a radially constant wall thickness, the person of ordinary skill in the art will appreciate that in other embodiments, the wall thickness need not be constant. In such cases, the "wall thickness" is taken as the radially-averaged wall thickness. In certain desirable embodiments, the wall thickness at any one point along the circumference of the tubing is not less than 50% of the average wall thickness.

The annular cross-section of the tubing 100 comprises an annular fluoropolymer layer 130, which is formed from at least 75 wt % fluoropolymer, and has an inner surface 132 and an outer surface 134. Disposed about the fluoropolymer layer is an annular thermoplastic layer 140, which is formed from at least 75 wt % thermoplastic (e.g., thermoplastic polyurethane, thermoplastic polyester, and/or thermoplastic polyamide), and has an inner surface 142 that is in contact with the outer surface 134 of the fluoropolymer layer, and an outer surface 144.

Notably, in this aspect of the disclosure, the fluoropolymer layer is covalently bound to the thermoplastic layer. As described in more detail below, the present inventors have determined that providing covalent bonding between the layers can help to prevent delamination, without undesirably affecting the other necessary properties of the tubings.

As described above, the fluoropolymer layer is formed from a substantial amount of, i.e., at least 75 wt %, fluoropolymer. The person of ordinary skill in the art will appreciate that a variety of additional materials can be used in the fluoropolymer layer, e.g., to aid in processing or to provide a desired appearance of the fluoropolymer layer. The person of ordinary skill in the art will appreciate that a variety of commercial fluoropolymer grades can be suitable for use in the tubings described herein. In certain embodiments of the tubings as otherwise described herein, the fluoropolymer layer is formed from at least 75 wt % fluoropolymer, for example, at least 85 wt %, at least 90 wt %, or even at least 95 wt % fluoropolymer. In other embodiments as otherwise described herein, the fluoropolymer layer consists essentially of fluoropolymer.

A variety of fluoropolymer materials can be used as the fluoropolymer of the fluoropolymer layer. The person of ordinary skill in the art will appreciate that there are a variety of fluoropolymer materials that are resistant to hydrocarbon fuel, have acceptable fuel vapor properties, and is amenable to formation into tubings by extrusion. In certain especially desirable embodiments, the fluoropolymer is a polymer or copolymer having monomeric residues having free radical-abstractable hydrogen atoms.

For example, in certain embodiments of the tubings as otherwise described herein, the fluoropolymer layer is formed from at least 75 wt % (e.g., at least 90 wt %, or consists essentially of) a PVDF polymer. (As used herein, the person of ordinary skill in the art will appreciate that "at least 75% of a PVDF polymer" includes use of a plurality of PVDF polymers in a total amount of at least 75%; analogous statements related other amounts and other polymers will be understood similarly.) PVDF is a highly non-reactive and pure thermoplastic fluoropolymer. PVDF is a specialty plastic material in the fluoropolymer family; it is used generally in applications requiring the highest purity, strength, and resistance to solvents, acids, bases and heat and low smoke generation during a fire event. Compared to other fluoropolymers, it has an easier melt process because of its relatively low melting point. A PVDF polymer, as used herein, is a polymer having at least 40 mol % (e.g., at least 50 mol %) vinylidene difluoride residues. Thus, the PVDF polymer can be a homopolymerize of vinylidene difluoride, or a copolymer of vinylidene difluoride with additional monomer(s). In certain desirable embodiments, such copolymers have at least 75 wt %, at least 90 wt % or even consist essentially of fluorinated monomeric subunits. Desirable PVDF copolymers include, for example, the copolymers of vinylidene difluoride and trifluoroethylene, usually in ratios of about 50:50 wt % and 65:35 wt % (equivalent to about 56:44 mol % and 70:30 mol %) and vinylidene difluoride and tetrafluoroethylene and vinylidene difluoride and hexafluoropropylene (HFP). Commercially available vinylidene difluoride-containing fluoropolymers include, for example, those fluoropolymers having the trade designations; "KYNAR" (e.g., "KYNAR 740", "KYNARFLEX 2500" AND "KYNARFLEX 2750") as marketed by Arkema; "HYLAR" (e.g., "HYLAR 700") as marketed by Solvay Solexis, Morristown, N.J.; and "FLUOREL" (e.g., "FLUOREL FC-2178") as marketed by Dyneon, LLC. Other examples include PVDF-HFP copolymers available under the trade designation "ULTRAFLEX B."

But the person of ordinary skill in the art will appreciate that other fluorinated materials can be used in the tubings of the disclosure. For example, in certain embodiments of the tubings as otherwise described herein, the fluoropolymer of the fluoropolymer layer include a PVDF polymer, a fluorinated ethylene propylene copolymer ("a FEP polymer"), a copolymer of tetrafluoroethylene and perfluoropropyl vinyl ether ("a PFA polymer"), a copolymer of tetrafluoroethylene and perfluoromethyl vinyl ether ("a MFA polymer"), a copolymer of ethylene and tetrafluoroethylene ("an ETFE polymer"), a copolymer of ethylene and chlorotrifluoroethylene ("an ECTFE polymer"), polychlorotrifluoroethylene ("a PCTFE polymer"), a terpolymer including tetrafluoroethylene, hexafluoropropylene, and vinylidenefluoride ("a THV polymer"), or a combination or copolymer thereof. And the person of ordinary skill in the art will understand that other fluorinated polymers can be used; desirably, the polymer has at least 75 mol %, at least 90 mol %, or even at least 95 mol % fluorinated monomer residues.

And in certain embodiments as otherwise described herein, a fluoropolymer layer can include a minor amount (e.g., no more than 25 wt %) of other polymer (i.e., not fluoropolymer) that has free radical-abstractable hydrogen atoms. Desirably, such polymer is miscible with, or otherwise compatible with the fluoropolymer. The use of such a polymer can help to strengthen the bond of the fluoropolymer layer with the thermoplastic polyurethane layer.

The fluoropolymer layer can be formed in variety of thicknesses. The person of ordinary skill in the art will, based on the disclosure herein, balance material properties, fuel vapor permeance properties and cost, among other factors, to provide a desired thickness of the fluoropolymer layer. In certain embodiments of the tubings as otherwise described herein, the fluoropolymer layer has a thickness in the range of 0.1 mm to 10 mm. For example, in various embodiments as otherwise described herein, the fluoropolymer layer has a thickness in the range of 0.1 mm to 5 mm, or 0.1 mm to 3 mm, or 0.1 mm to 2 mm, or 0.1 mm to 1 mm, or 0.1 mm to 0.5 mm, or 0.2 mm to 10 mm, or 0.2 mm to 5 mm, or 0.2 mm to 3 mm, or 0.2 mm to 2 mm, or 0.2 mm to 1 mm, or 0.2 mm to 0.5 mm, or 0.5 mm to 10 mm, or 0.5 mm to 5 mm, or 0.5 mm to 3 mm, or 0.5 mm to 2 mm, or 1 mm to 10 mm, or 1 mm to 5 mm, or 1 mm to 3 mm, or 2 mm to 10 mm, or 2 mm to 7 mm, or 2 mm to 5 mm. The fuel vapor permeance will be a function of layer thickness, and the thickness needed to provide a particular desired permeance will depend on the identity of the fluoropolymer layer. For example, for many commercial grades of PVDF-HFP, a thickness in the range of 0.25 mm to 0.4 mm can typically provide a fuel vapor permeance of <15 $g/m^2$/day at 23° C. Grades with less hexafluoropropylene and more vinylidine difluoride monomeric units can require thicker layers to achieve the same permeability.

As described above, the thermoplastic layer is formed from a substantial amount of, i.e., at least 75 wt %, thermoplastic (e.g., thermoplastic polyurethane, thermoplastic polyester, and/or thermoplastic polyamide). The person of ordinary skill in the art will appreciate that a variety of additional materials can be used in the thermoplastic layer, e.g., stabilizers, waxes, among others, to, for example, aid in processing or to provide a desired appearance or reduce the tack of the thermoplastic polyurethane layer. In certain embodiments of the tubings as otherwise described herein, the thermoplastic layer is formed from at least 95 wt % thermoplastic. In other embodiments as otherwise described herein, the thermoplastic polyurethane layer consists essentially of thermoplastic.

In certain embodiments as otherwise described herein, the thermoplastic is thermoplastic polyurethane (e.g., thermoplastic polyurethane elastomer), thermoplastic polyester (e.g., thermoplastic polyester elastomer), and/or thermoplastic polyamide (e.g., thermoplastic polyamide elastomer).

In certain embodiments as otherwise described herein, the thermoplastic includes (or is) thermoplastic polyurethane (e.g., thermoplastic polyurethane elastomer).

In certain embodiments as otherwise described herein, the thermoplastic layer is at least 75 wt % thermoplastic polyurethane (e.g., at least 75 wt % of a polyether-type thermoplastic polyurethane). In certain such embodiments, the thermoplastic layer is at least 95 wt % thermoplastic polyurethane (e.g., at least 95 wt % of a polyether-type thermoplastic polyurethane).

In certain embodiments as otherwise described herein, the thermoplastic includes (or is) thermoplastic polyester (e.g., thermoplastic polyester elastomer).

In certain embodiments as otherwise described herein, the thermoplastic layer is at least 75 wt % thermoplastic polyester. In certain such embodiments, the thermoplastic layer is at least 95 wt % thermoplastic polyester.

In certain embodiments as otherwise described herein, the thermoplastic includes (or is) thermoplastic polyamide (e.g., thermoplastic polyamide elastomer).

In certain embodiments as otherwise described herein, the thermoplastic layer is at least 75 wt % thermoplastic polyamide. In certain such embodiments, the thermoplastic layer is at least 95 wt % thermoplastic polyamide.

A variety of thermoplastic polyurethane materials can be used as the thermoplastic polyurethane material of the thermoplastic layer. The person of ordinary skill in the art will appreciate that there are a variety of thermoplastic polyurethane materials that provide desired mechanical properties to a tubing and are amenable to formation into tubings by extrusion. The person of ordinary skill in the art will, based on the present disclosure, select an appropriate thermoplastic polyurethane to provide any other desirable properties, for example, adequate fuel/chemical resistance, flexibility, a low glass transition temperature (e.g., using a soft-segment phase) for low temperature applications, adequate weatherability/UV resistance, and adequate mechanical strength to withstand installation, to maintain fitting retention, and to maintain a seal in use.

Typically, a thermoplastic polyurethane is formed by reacting a polyol with an isocyanate. As the person of ordinary skill in the art will appreciate, the overall properties of the polyurethane will depend, among other things, upon the type of polyol and isocyanate, crystallinity in the polyurethane, the molecular weight of the polyurethane and chemical structure of the polyurethane backbone. Many typical thermoplastic polyurethanes also include a chain extender such as 1,4-butanediol that can form hard segment blocks in the polymer chain. Polyurethanes can generally be classified as being either thermoplastic or thermoset, depending on the degree of crosslinking present. Thermoplastic urethanes do not have primary crosslinking while thermoset polyurethanes have a varying degree of crosslinking, depending on the functionality of the reactants. As used herein, a "thermoplastic polyurethane" is one in which at least 95 mol %, at least 99 mol %, or even substantially all of its polyol constituent is difunctional. As described in more detail below, such materials can be crosslinked by electron beam treatment; despite such crosslinking, the present disclosure considers such materials "thermoplastic."

Thermoplastic polyurethanes are commonly based on either methylene diisocyanate or toluene diisocyanate and include both polyester and polyether grades of polyols. Thermoplastic polyurethanes can be formed by a "one-shot" reaction between isocyanate and polyol (e.g., with optional chain extender) or by a "pre-polymer" system, wherein a curative is added to the partially reacted polyolisocyanate complex to complete the polyurethane reaction. Examples of some common thermoplastic polyurethane elastomers based on "pre-polymers" are "TEXIN", a tradename of Bayer Materials Science, "ESTANE", a tradename of Lubrizol, "PELLETHANE", a tradename of Lubirzol, and "ELASTOLLAN", a tradename of BASF.

In certain embodiments of the tubings as described herein, the thermoplastic polyurethane layer is a polyether-type thermoplastic polyurethane, a polyester-type thermoplastic polyurethane, or a combination or copolymer thereof. Typically, thermoplastic polyurethanes used in fuel tubings are ester-type thermoplastic polyurethanes. Ester-type thermoplastic polyurethanes can be based on different compositions of substituted or unsubstituted methane diisocyanate (MDI) and a substituted or unsubstituted dihydroxy alcohol (a glycol).

However, in certain advantageous embodiments of the tubings as otherwise described herein, the thermoplastic polyurethane of the thermoplastic polyurethane layer is a polyether-type polyurethane. Polyether-type thermoplastic polyurethanes can be more resistant to hydrolytic degradation than polyester-type thermoplastic polyurethanes. But the fact that they generally have lower resistance to hydrocarbons makes polyether-type thermoplastic polyurethanes generally less suitable than polyester-type polyurethanes for use in conventional fuel tubings. And the softness of some grades of polyether-type thermoplastic polyurethanes can make them less suitable for use in tubings like those described here. The methods and tubings described herein can nonetheless allow polyether-type materials to be used.

A variety of thermoplastic polyester materials can be used as the thermoplastic material of the thermoplastic layer. The person of ordinary skill in the art will appreciate that there are a variety of thermoplastic polyester materials that provide desired mechanical properties to a tubing and are amenable to formation into tubings by extrusion. The person of ordinary skill in the art will, based on the present disclosure, select an appropriate thermoplastic polyester to provide any other desirable properties, for example, adequate fuel/chemical resistance, flexibility, a low glass transition temperature (e.g., using a soft-segment phase) for low temperature applications, adequate weatherability/UV resistance, and adequate mechanical strength to withstand installation, to maintain fitting retention, and to maintain a seal in use. One example of a thermoplastic polyester elastomer available from Dupont under the trade name HYTREL.

A variety of thermoplastic amide materials can be used as the thermoplastic material of the thermoplastic layer. The person of ordinary skill in the art will appreciate that there are a variety of thermoplastic amide materials that provide desired mechanical properties to a tubing and are amenable to formation into tubings by extrusion. The person of ordinary skill in the art will, based on the present disclosure, select an appropriate thermoplastic amide to provide any other desirable properties, for example, adequate fuel/chemical resistance, flexibility, a low glass transition temperature (e.g., using a soft-segment phase) for low temperature applications, adequate weatherability/UV resistance, and adequate mechanical strength to withstand installation, to maintain fitting retention, and to maintain a seal in use. In certain embodiments as otherwise described herein the thermoplastic amide is a polyether-type thermoplastic amide, such as an elastomer available from Arkema under the trade name PEBAX.

Notably, the tubings described herein can be made using relatively soft thermoplastic materials (i.e., as compared to conventional tubings). For example, in certain embodiments of the tubings described herein the thermoplastic of the thermoplastic layer has a Shore A hardness of less than 80, e.g., less than 78, or less than 75, or even less than 70. Notably, the tubings described herein can be fabricated using softer materials but nonetheless be sufficiently robust. And the use of soft materials can allow for a tighter bend radius, which can be advantageous. Of course, materials of conventional hardness can also be used. Thus, in certain embodiments of the tubings as otherwise described herein, the thermoplastic of the thermoplastic layer can have a Shore A hardness in the range of 50-95, e.g., in the range of 50-80, or 50-78, or 50-75, or 50-70, or 60-95, or 60-80, or 60-78, or 60-75, or 60-70, or 70-95 or 70-80.

The thermoplastic layer can be formed in variety of thicknesses. The person of ordinary skill in the art will, based on the disclosure herein, balance material properties and cost, among other factors, to provide a desired thickness of the thermoplastic layer. In certain embodiments of the tubings as otherwise described herein, the thermoplastic layer has a thickness in the range of 0.5 mm to 20 mm. For example, in various embodiments as otherwise described herein, the thermoplastic layer has a thickness in the range of or 0.5 mm to 10 mm, or 0.5 mm to 5 mm, or 0.5 mm to 3 mm, or 0.5 mm to 2 mm, or 1 mm to 20 mm, or 1 mm to 10 mm, or 1 mm to 5 mm, or 1 mm to 3 mm, or 2 mm to 20 mm, or 2 mm to 10 mm, or 2 mm to 7 mm, or 2 mm to 5 mm, or 5 mm to 20 mm, or 5 mm to 15 mm, or 5 mm to 10 mm, or 10 mm to 20 mm.

Figure 2:
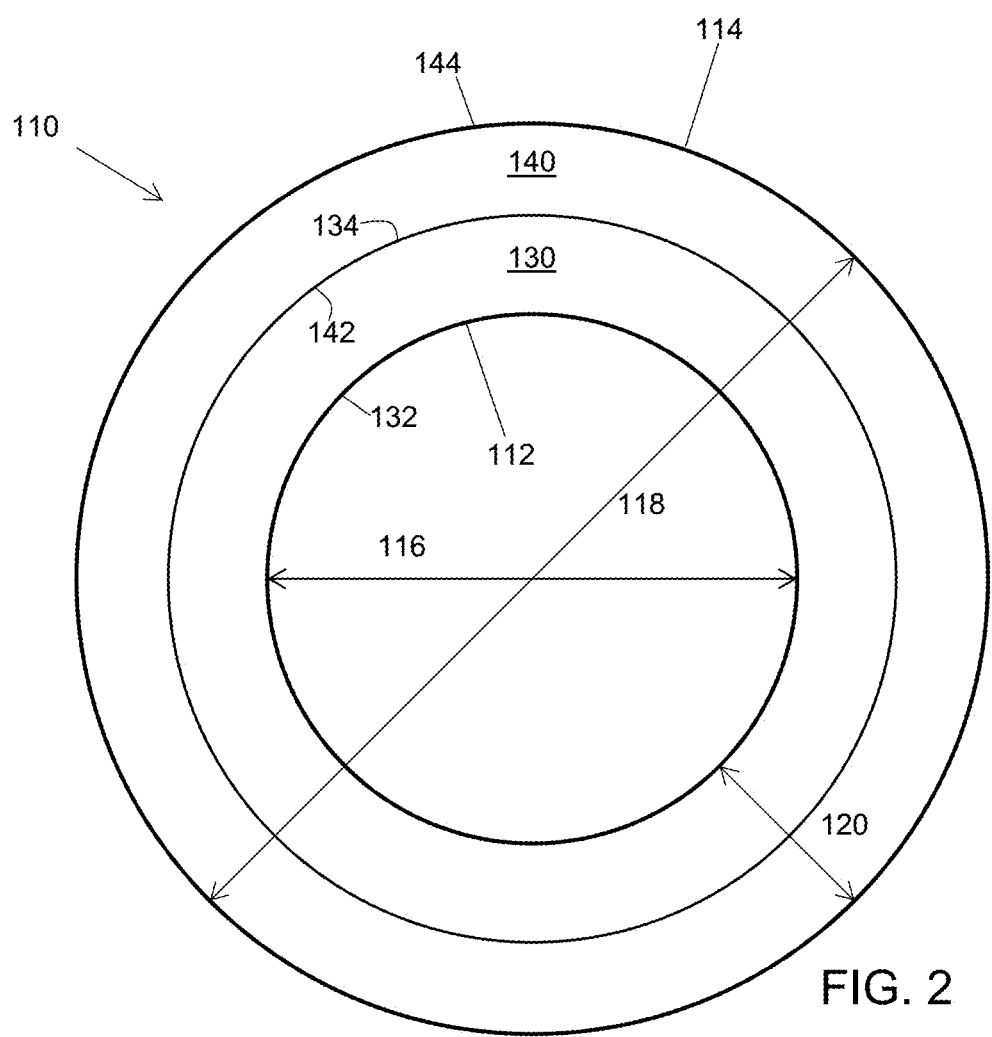
FIG. 2 is a cross-sectional schematic view of the length of tubing of FIG. 1.
Figure 3:
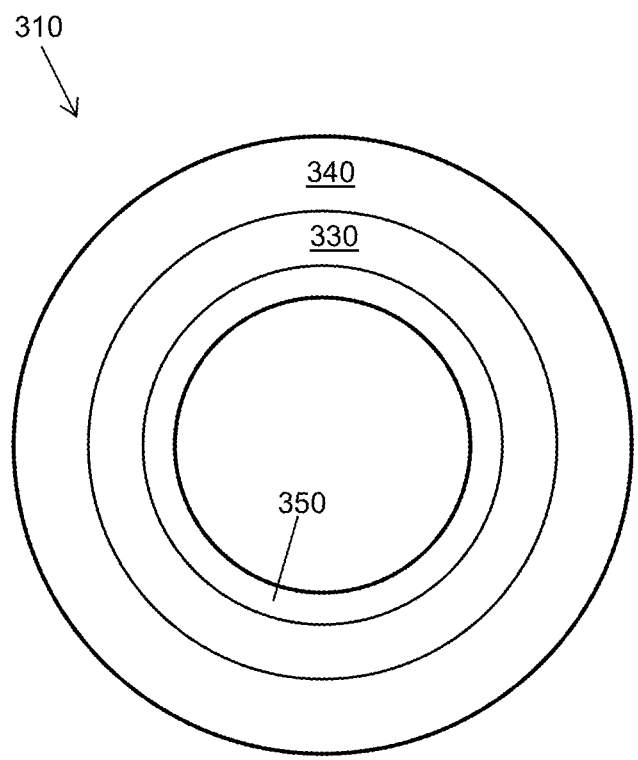
FIG. 3 is a cross-sectional schematic view of a length of tubing according to another embodiment of the disclosure.

The person of ordinary skill in the art will appreciate that the tubings of the disclosure can be configured in many ways. For example, in certain embodiments as otherwise described herein, and as shown in FIG. 1, the inner surface of the fluoropolymer layer forms the inner surface of the tubing. The fluoropolymer layer can be made of materials that are sufficiently resistant to hydrocarbon fuels that a separate liner layer is not necessary. Of course, in other embodiments, the annular cross-section further includes one or more inner annular polymer layers disposed on the inside surface of the fluoropolymer layer. Such an embodiment is shown in the cross-sectional schematic view of FIG. 3. Here, annular cross-section 310 includes not only a fluoropolymer layer 330 and a thermoplastic layer 340, but also one or more (here, one) inner annular polymer layers 350 disposed on the inside surface of the fluoropolymer layer. Despite not being the innermost layer, the fluoropolymer layer can nonetheless provide a barrier to fuel vapor. A wide variety of materials can be used in the one or more inner annular polymer layer(s). For example, in certain embodiments, the inner annular polymer layer is formed from a thermoplastic polyurethane, thermoplastic polyether, and/or thermoplastic polyamide, which can be, for example, the same or different as the thermoplastic polyurethane, thermoplastic polyether, and/or thermoplastic polyamide of the thermoplastic layer. Such three-layer tubings are described in U.S. Pat. No. 7,866,348, which is hereby incorporated herein by reference in its entirety; the person of ordinary skill in the art will appreciate that the tubing designs described therein can be adapted to be additional examples of tubings of the present disclosure.

Figure 4:
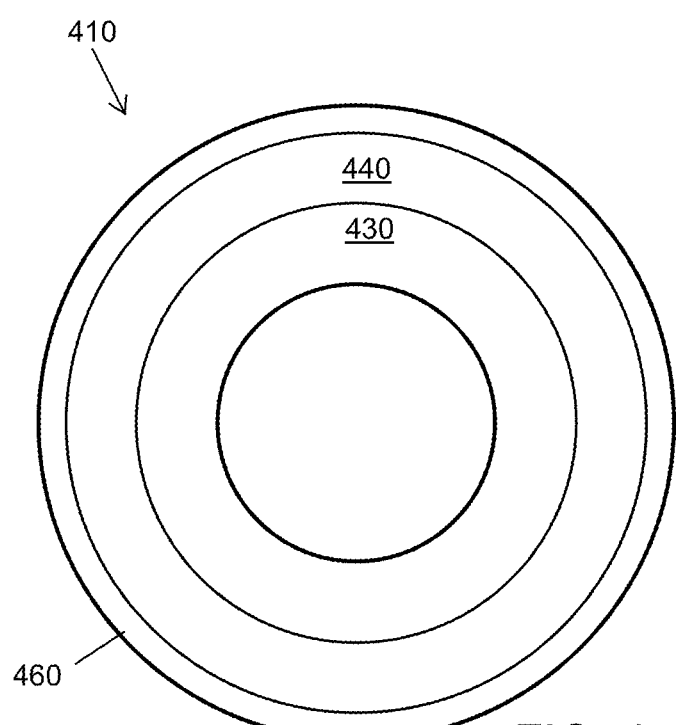
FIG. 4 is a cross-sectional schematic view of a length of tubing according to another embodiment of the disclosure.

Similarly, in certain embodiments as otherwise described herein, and as shown in FIG. 1, the outer surface of the thermoplastic layer forms the outer surface of the tubing. The thermoplastic layer can be made of materials that are sufficiently robust that a separate protective layer is not necessary. Of course, in other embodiments, the annular cross-section further includes one or more outer annular polymer layers disposed on the outside surface of the fluoropolymer layer. Such an embodiment is shown in the cross-sectional schematic view of FIG. 4. Here, annular cross-section 410 includes not only a fluoropolymer layer 430 and a thermoplastic layer 440, but also one or more (here, one) inner annular polymer layers 460 disposed on the outside surface of the thermoplastic layer. Despite not being the outermost layer, the thermoplastic layer can nonetheless provide desirable mechanical properties to the tubing. A wide variety of materials can be used in the one or more outer annular polymer layer(s). For example, in certain embodiments, the outer annular polymer layer is formed from poly(vinyl chloride). Such three-layer tubings are described in U.S. Pat. No. 8,092,881, which is hereby incorporated herein by reference in its entirety; the person of ordinary skill in the art will appreciate that the tubing designs described therein can be adapted to be additional examples of tubings of the present disclosure.

In certain embodiments, the material volume of the tubing is at least 50%, at least 70%, at least 90%, or even at least 95% made up of the thermoplastic layer and the fluoropolymer layer.

Notably, the tubings of the disclosure do not require coupling agents or adhesive layers to adhere the thermoplastic layer to the fluoropolymer layer.

As described in more detail below, the tubings of the present disclosure can be made by extrusion. Accordingly, it can be made in a wide variety of lengths. In certain embodiments, the length of a length of flexible tubing as otherwise described herein is at least 1 m. In various embodiments as otherwise described herein, the length of the length of flexible tubing is at least 2 m, at least 3 m, at least 5 m, or even at least 10 m.

The tubings of the present disclosure can be made in a variety of sizes. For example, in certain embodiments of the tubings as otherwise described herein, the inner diameter of the annular cross-section is in the range of 0.5 mm to 40 mm. In various particular embodiments of the flexible tubing as otherwise described herein, the inner diameter of the annular cross-section is in the range of 0.5 mm to 30 mm, or 0.5 mm to 20 mm, or 0.5 mm to 15 mm, or 0.5 mm to 10 mm, or 0.5 mm to 5 mm, or 1 mm to 40 mm, or 1 mm to 30 mm, or 1 mm to 20 mm, or 1 mm to 15 mm, or 1 mm to 10 mm, or 5 mm to 40 mm, or 5 mm to 30 mm, or 5 mm to 20 mm, or 5 mm to 15 mm, or 5 mm to 10 mm, or 10 mm to 40 mm, or 10 mm to 30 mm, or 10 mm to 20 mm. Similarly, in certain embodiments of the tubings as otherwise described herein, the wall thickness of the annular cross-section is in the range of 0.5 mm to 25 mm. In various particular embodiments of the flexible tubing as otherwise described herein, the wall thickness of the annular cross-section is in the range of 0.5 mm to 15 mm, or 0.5 mm to 10 mm, or 0.5 mm to 8 mm, or 0.5 mm to 5 mm, or 0.5 mm to 3 mm, or 0.5 mm to 2 mm, or 1 mm to 25 mm, or 1 mm to 15 mm, or 1 mm to 10 mm, or 1 mm to 8 mm, or 1 mm to 5 mm, or 1 mm to 3 mm, or 2 mm to 25 mm, or 2 mm to 15 mm, or 2 mm to 10 mm, or 2 mm to 8 mm, or 2 mm to 5 mm, or 5 mm to 25 mm, or 5 mm to 15 mm, or 5 mm to 10 mm, or 5 mm to 8 mm, or 10 mm to 25 mm, or 10 mm to 15 mm, or 15 mm to 25 mm.

The description of the tubings herein imply an interface between the thermoplastic layer and the fluoropolymer layer (i.e., at the outer surface of the fluoropolymer layer and the inner surface of the thermoplastic layer). As the person of ordinary skill in the art will appreciate, in many real-world samples there will be some intermingling of the materials at the interface. The person of ordinary skill in the art will nonetheless be able to discern where one layer ends and the other begins.

As described above, the fluoropolymer layer is covalently bound to the thermoplastic layer. In certain desirable embodiments, and as described in more detail below, the covalent bonding of the fluoropolymer layer to the thermoplastic layer is effected by treatment with an electron beam. As the person of ordinary skill in the art will appreciate, treatment with an electron beam will provide a characteristic type of bonding between the thermoplastic and the fluoropolymer. Without intending to be bound by theory, an electron beam causes high-energy electrons to collide with the material, which initiate the production of free radicals on the polymer backbones via abstraction of atoms (e.g., hydrogen atoms) from the polymers. Two free radical species can combine (terminate) to form a new bond. New bonds formed between different polymer chains will result in a covalent bonding of the materials; when this happens between a thermoplastic polymer chain and a fluoropolymer chain, a covalent bond between the layers is formed. Covalent bonding of the fluoropolymer layer to the thermoplastic layer can be through a plurality of >CH— moieties and/or >CF— moieties of the fluoropolymer, where the "—" indicates the bond to the polyurethane, and the ">" indicates the bonds to the fluoropolymer chain. For example, in certain embodiments, covalent bonding of the fluoropolymer layer to the thermoplastic layer is through a plurality of >CH— moieties and/or >CF— moieties of the fluoropolymer to a plurality of >CH— moieties of soft segments of the thermoplastic (e.g., of polyether segments thereof). In certain desirable embodiments, substantially no separate cross-linking agent forms the covalent bonds between the fluoropolymer layer and the thermoplastic layer. The person of ordinary skill in the art will appreciate that some degree of crosslinking of the layers themselves may also occur.

The present inventors have determined that such covalent bonding between layers can advantageously help to make the layers more resistant to separation or delamination upon exposure to fuel. For example, in certain embodiments as otherwise described herein, the length of tubing does not exhibit substantial delamination when immersed in CE10 fuel at 40° C. for three months. In certain embodiments as otherwise described herein, the length of tubing is at least four times as resistant to lamination as an equivalent tubing lacking covalent bonds between the fluoropolymer layer and the thermoplastic layer. The person can, for example, prepare for comparison purposes a reference tubing that is identical to the subject tubing, but has not undergone electron beam treatment.

The use of a fluoropolymer layer, e.g., using a PVDF polymer, can provide the tubings described herein with excellent resistance to permeation of hydrocarbon fuel vapor. For example, in certain embodiments as otherwise described herein, the tubing has a permeation rating of no more than 15 g/m$^2$/day, e.g., 7 g/m$^2$/day or 5 g/m$^2$/day, under SAE J1737 test conditions.

As the person of ordinary skill in the art would appreciate, a number of other additives may be present in the layers, such as leftover polymerization agent (i.e., from the polymerizations of the thermoplastic and/or the fluoropolymer), antioxidants, flame retardants, acid scavengers, anti-static agents and processing aids such as melt flow index enhancers.

Another aspect of the disclosure is a method for making a length of flexible tubing as described herein. The method includes providing a length of tubing having an annular cross-section, the annular cross-section having an inner surface and an outer surface, the annular cross-section including: an annular fluoropolymer layer formed from at least 75 wt % fluoropolymer (e.g., at least 75 wt % of a PVDF polymer), the fluoropolymer layer having an outer surface and an inner surface; and disposed about the annular fluoropolymer layer, an annular thermoplastic layer formed from at least 75 wt % thermoplastic, the thermoplastic layer having an inner surface in contact with the outer surface of the fluoropolymer layer; treating the length of tubing with an electron beam. The structure of the tubing, the composition of the fluoropolymer layer and the composition of the thermoplastic layer can be as otherwise described herein (e.g., as in any combination of the appended embodiments 2-32).

The person of ordinary skill in the art, based on the disclosure herein, will select appropriate electron beam treatments to provide delamination-resistant tubings. For example, in certain embodiments, the electron beam treatment is performed with a dose of at least 5 Mrad, e.g., at least 9 Mrad. In certain embodiments as otherwise described herein, the electron beam dose is in the range of 5 Mrad to 50 Mrad, or 9 Mrad to 50 Mrad, or 13 Mrad to 50 Mrad, or 5 Mrad to 30 Mrad, or 9 Mrad to 30 Mrad, or 13 Mrad to 30 Mrad, or 5 Mrad to 20 Mrad, or 9 Mrad to 20 Mrad, or 13 Mrad to 20 Mrad, or 9 Mrad to 17 Mrad. The person of ordinary skill in the art can tune treatment times to provide the desired dose. In certain embodiments as otherwise described herein, the energy of the electron beam is at least 1 MeV, e.g., in the range of 1-20 MeV.

The person of ordinary skill in the art can otherwise prepare the tubings of the disclosure using conventional methods. For example, in certain embodiments, the length of tubing is formed by co-extruding the fluoropolymer layer with the thermoplastic layer. Conventional extrusion methods, such as those described in U.S. Pat. Nos. 7,866,348 and 8,092,881, can be used to provide the length of flexible tubing.

In certain desirable embodiments, the treatment with the electron beam forms covalent bonds between the fluoropolymer layer and the thermoplastic layer, as described above.

As covalent bonding of layers can be mediated by free radicals, it can in some embodiments be desirable to include a free radical initiator in the thermoplastic layer and/or the fluoropolymer, i.e., before it is treated with electron beam. The use of a free radical initiator can allow a higher degree of covalent bonding to be obtained for a given electron beam dose, or can allow a lower electron beam dose to be used. Suitable free radical initiators include, for example, benzophenone, ortho- and para-methoxybenzophenone, dimethylbenzophenone, di methoxybenzophenone, diphenoxybenzophenone, acetophenone, o-methoxy-acetophenone, acenaphthenequinone, methyl ethyl ketone, valerophenone, hexanophenone, alpha-phenylbutyrophenone, p-morpholinopropiophenone, dibenzosuberone, 4-morpholinobenzophonone, benzoin, benzoin methyl ether, 3-o-morpholinodeoxybenzoin, p-diacetylbenzene benzene, 4-aminobenzophenone, 4'-methoxyacetophenone, alpha-tetralone, 9-acetyl-phenanthrene, 2-acetyl-phenanthrene, 10-thioxanthenone, 3-acetyl-phenanthrene, 3-acetylindole, 9-fluorenone, 1-indanone, 1,3,5-triacetylbenzene, thioxanthen-9-one, xanthene-9-one, 7-H-benz[de]anthracen-7-one, benzoin tetrahydropyranyl ether, 4,4'-bis (dimethylamino)-benzophenone, 1'-acetonaphthone, 2'acetonaphthone, acetonaphthone and 2,3-butanedione, benz[a]anthracene-7,12-dione, 2,2-dimethoxy-2-phenylaceto-phenone, alpha, alpha-diethoxy-acetophenone, alpha, alpha-dibutoxy-acetophenone, anthraquinone, isopropylthioxanthone and the like. Polymeric initiators include poly(ethylene/carbon monoxide), oligo[2-hydroxy-2-methyl-1-[4-(1-methylvinyl)-phenyl]propanone], polymethylvinyl ketone, and polyvinylaryl ketones. Additional free radical initiators include anthrone, xanthone, the Irgacure™ series of initiators from Ciba-Geigy Corp., including 2,2-dimethoxy-2-phenylaceto-phenone (Irgacure™ 651); 1-hydroxycyclohexylphenyl ketone (Irgacure™ 184) and 2-methyl-1-[4-(methylthio) phenyl]-2-morpholino propan-1-one (Irgacure™ 907). The most preferred initiators will have low migration from the formulated resin, as well as a low vapor pressure and low decomposition at extrusion temperatures and sufficient solubility in the materials to yield good efficiency. The vapor pressure and solubility, or polymer compatibility, of many familiar initiators can be easily improved if the initiators is derivatized. The derivatized initiators include, for example, higher molecular weight derivatives of benzophenone, such as 4-phenylbenzophenone, 4-allyloxybenzophenone, allyloxybenzophenone, 4-dodecyloxybenzophenone and the like. When present, the initiator is present in an amount in the range of 0.1 to 2 wt %.

But, advantageously, the present inventors have determined that it is not necessary to include a free radical initiator. So, in other embodiments as otherwise described herein, the thermoplastic polyurethane layer and the fluoropolymer are substantially free of (e.g., less than 0.1 wt %, less than 0.05 wt % or less than 0.01 wt %) free radical initiators, i.e., at the time of the electron beam treatment.

Another aspect of the disclosure is a flexible tubing, made according to a method as described herein.

The flexible tubings as described herein are especially useful in the transmission of hydrocarbon fuels. Accordingly, another aspect of the disclosure is a method for transmitting a hydrocarbon fuel, including providing a flexible tubing as described herein, and flowing the hydrocarbon fuel through the tubing from a first end to a second end thereof. A wide variety of hydrocarbon fuels can be used with the tubings of the disclosure, e.g., gasoline, diesel fuel, kerosene.

The tubings described herein can be used to transfer gasoline and other hydrocarbon fuels in engines, such as non-automotive engines. The present disclosure provides a low-permeation design which can be configured to meet the permeation performance requirements of US EPA and the State of California which requires particularly stringent permeation performance. Thus, another aspect of the disclosure is a fuel-powered device comprising a fuel tank, a fuel-powered engine, and a length of tubing of the present disclosure fluidly connecting the fuel tank with the fuel-powered engine (i.e., configured so as to transmit fuel from the fuel tank to the engine). The engine can be an automotive engine, or, in other embodiments, a non-automotive engine. Non-automotive devices include equipment such as motor-cycles, 4-wheel and other recreational vehicles, lawn tractors, string trimmers, leafblowers, snowblowers, lawnmowers, tillers, chain saws and other yard care equipment.

EXAMPLES

Various aspects of the tubings and methods of the disclosure are further described with respect to the non-limiting examples described below.

Example 1

Prototypes 1 and 2 are two-layer fuel tubes with an ester-based, thermoplastic polyurethane (TPU) jacket and a polyvinylidene difluoride (PVDF) based liner, manufactured by co-extrusion.

Without intending to be bound by theory, the inventors believe that during the co-extrusion process the liner and jacket layer are combined. The thermoplastic polyurethane and PVDF copolymers can inter-diffuse at the resulting interface. Adhesion can occur at the interface due to non-covalent interactions between the two polymers. For example, dipole-dipole interactions between the carbonyl groups present in the soft segment of an ester-based thermoplastic polyurethane and the C—F bond in PVDF. However, these interactions are reversible and, after extended exposure to a fuel such as CE10, the liner can separate from the jacket due to loss of interlayer adhesion. This is undesirable.

Fuel tubing (3/32" ID and 3/16" OD) was subjected to electron beam treatment at NEO-beam (Middlefield, Ohio) using a voltage of 4.5 MeV and a beam current of 34 mA to provide two different dosages (about 10 Mrad and about 14 Mrad).

| Tubing | Jacket | Liner |
| --- | --- | --- |
| Prototype 1 | Desmopan E85 (85A polyester based TPU) | Kynar 2500 (PVDF-HFP copolymer) |
| Prototype 2 | Elastollan C78 (80A polyester based TPU) | UltraFlex B (PVDF-HFP copolymer) |

The electron beam-treated tubing samples and the untreated controls were immersed in CE10 fuel at 40° C. and inspected weekly for delamination. The results of this evaluation are summarized in the following table:

| Material | Delamination? |
| --- | --- |
| Prototype 1 - no irradiation | @ 3 weeks |
| Prototype 1 - 10 MRad | No delamination after 3 months |
| Prototype 1 - 14 MRad | No delamination after 3 months |
| Prototype 2 - no irradiation | @ 2 weeks |
| Prototype 2 - 10 MRad | No delamination after 3 months |
| Prototype 2 - 14 MRad | No delamination after 3 months |

Figure 5:
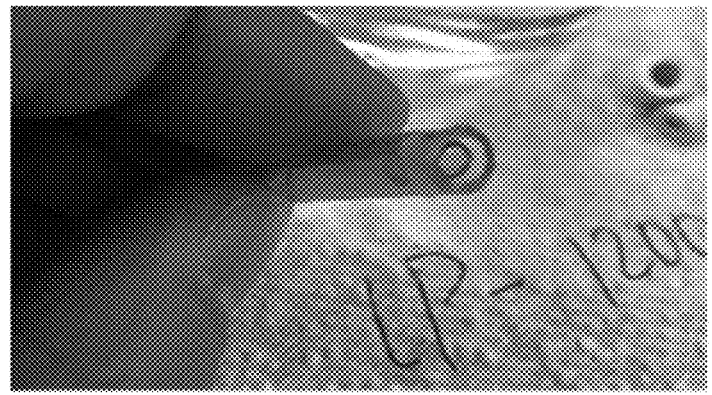
FIG. 5 is a photograph of a delaminated Prototype 2 sample as described in Example 1.
Figure 6:
FIG. 6 is a photograph of a delaminated prototype sample as described in Example 1.
Figure 7:
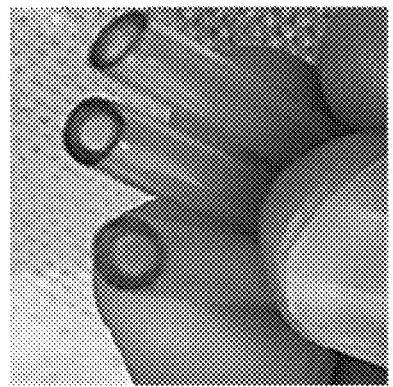
FIG. 7 is a set of photographs of electron beam treated samples as described in Example 1.
Figure 7:
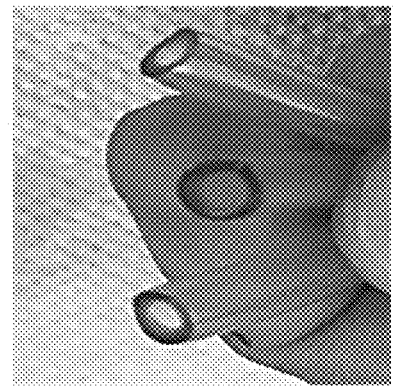
Figure 7:
Figure 7:
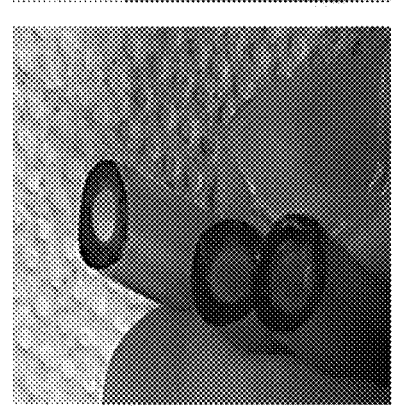

While the untreated controls exhibited delamination within a few weeks, the treated tubings did not exhibit any delamination after 3 months of fuel exposure. FIG. 5 is a photograph of the delaminated Prototype 2 sample, and FIG. 6 is a photograph of the delaminated Prototype 1 sample. FIG. 7 is a set of photographs of the treated samples, which exhibited no delamination. These results indicate that electron beam irradiation helps to prevent delamination from occurring in Prototype 1 and Prototype 2 upon exposure to fuel.

Example 2

Fuel tubing (3/32" ID and 3/16" OD) was subjected to electron beam treatment at NEO-beam (Middlefield, Ohio) using a voltage of 4.5 MeV and a beam current of 34 mA to achieve two different levels of total irradiation (about 10 Mrad and about 14 MRad).

| Tubing | Jacket | Liner |
| --- | --- | --- |
| Prototype 3 | Experimental 80A Polyether TPU | UltraFlex B (PVDF-HFP copolymer) |

The treated tubing samples and untreated controls were immersed in CE10 fuel at 40° C. and inspected weekly for delamination. The results of this evaluation are summarized in the following table:

| Material | Delamination? |
| --- | --- |
| Prototype 3 - no irradiation | @ 1 week |
| Prototype 3 - 10 MRad | No delamination @ 1 month |
| Prototype 3 - 14 MRad | No delamination @ 1 month |

Figure 8:
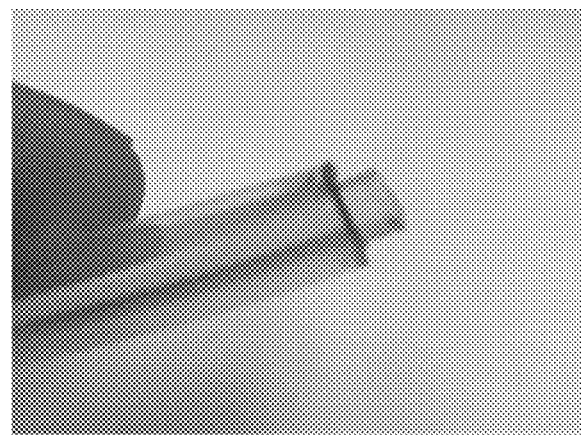
FIG. 8 is a set of photographs of untreated and electron beam treated samples as described in Example 2.
Figure 8:
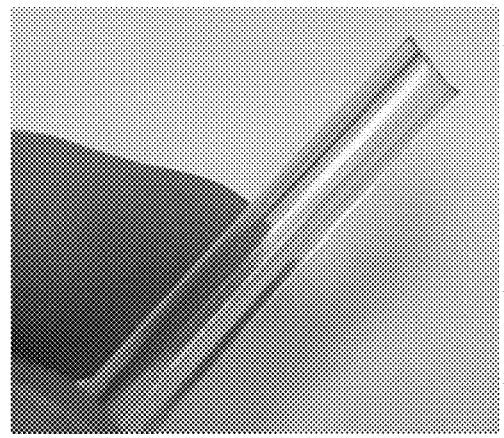
Figure 8:
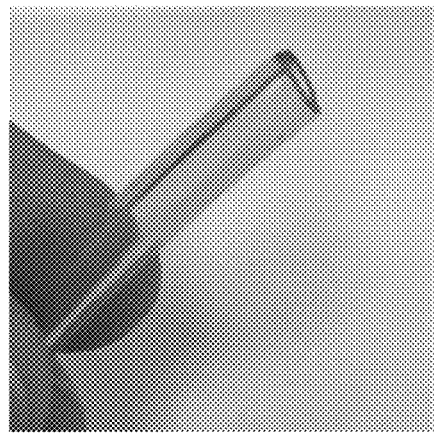

With the Prototype 3 control delamination was observed during the first week of soaking inspection. None of the irradiated samples exhibited any delamination through the week 2 inspection. FIG. 8 is a set of photographs of, top-to-bottom, the untreated sample after one week, the 10 Mrad treated sample after two weeks, and the 14 Mrad treated sample after two weeks. These results indicate that electron beam treatment helps to prevent delamination from occurring in Prototype 3.

Example 3

Figure 9:
FIG. 9 is a photograph of a permeation sample jar as described in Example 3.

UltraFlex B and Kynar 2500 (PVDF-HFP copolymers) were each extruded into film samples. The films were then subjected to electron beam treatment at NEO-beam (Middlefield, Ohio) using a voltage of 4.5 MeV and a beam current of 34 mA to achieve two different levels of total irradiation (about 10 Mrad and about 14 Mrad). The films were then tested, alongside untreated control films, for permeation using the following test method: A permeation jar having a glass body and a lid with an opening in the top is used; see FIG. 9. The top of the lid of the permeation jar is traces on the film sample (0.005" in thickness), and the sample is cut out along the trace and fitted into the lid of the jar. 30 mL of CE 10 fuel (recipe, 450 mL toluene, 450 mL isooctane, 100 mL ethanol) is added to the jar, and the lid with the sample is screwed on. An initial mass of the jar (i.e., together with the lid, fuel and sample) is recorded, and the jar is put in a fireproof oven at 43° C. The jar is removed from the oven and reweighed after a week. The permeation loss in g·m/m²/day is calculated using the following equation:

$$\frac{(\text{final mass} - \text{initial mass})(\text{thickness})}{(\text{film area})(\text{time})}$$

Figure 10:
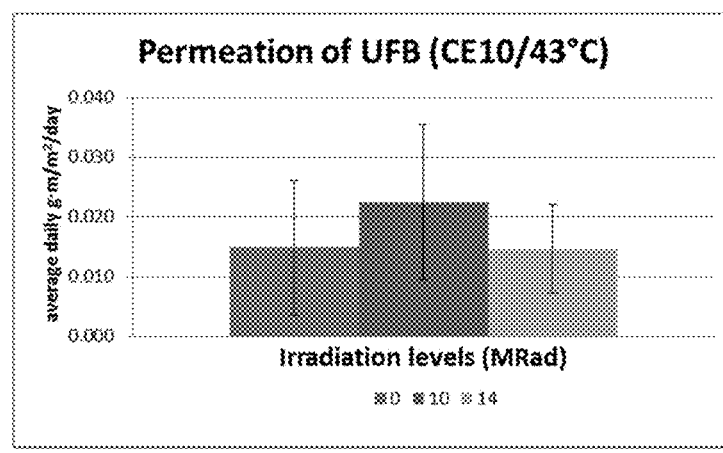
FIG. 10 is a graph of permeation data for Ultraflex B as described in Example 3.
Figure 11:
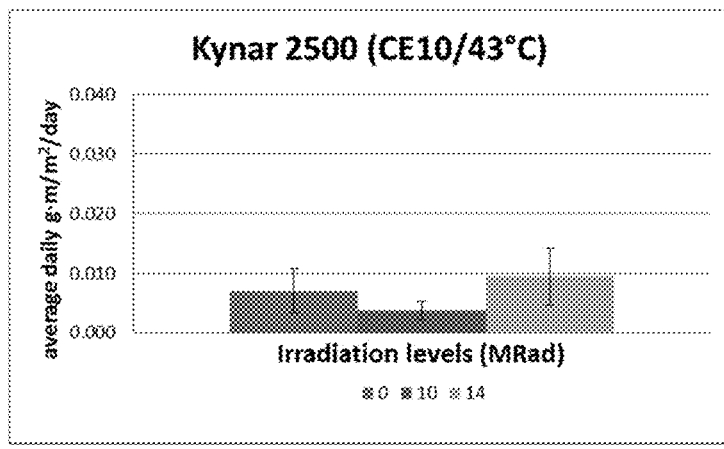
FIG. 11 is a graph of permeation data for Kynar 2500 as described in Example 3.

FIGS. 10 and 11 provide permeation data for various electron beam doses for UltraFlex B and Kynar 2500, respectively. Error bars are +/− one standard deviation. These data indicate that the electron beam treated film samples did not exhibit significantly different permeation levels than the untreated sample. This indicates that, at these doses, the electron beam treatment did not substantially change the fuel vapor barrier performance of the films.

Example 4

FIGS. 10 and 11 provide permeation data for various electron beam doses for UltraFlex B and Kynar 2500, respectively. Error bars are +/−one standard deviation. These data indicate that the electron beam treated film samples did not exhibit significantly different permeation levels than the untreated sample. This indicates that, at these doses, the electron beam treatment did not substantially change the fuel vapor barrier performance of the films. Fuel tubing (3/32" ID and 3/16" OD) was subjected to e-beam cross-linking at NEO-beam (Middlefield, Ohio) using a voltage of 4.5 MeV and a beam current of 34 mAmps to achieve a total irradiation of 2 Mrad.

| Tubing | Jacket | Liner |
| --- | --- | --- |
| Prototype 2 | Elastollan C78 (80A polyester based TPU) | UltraFlex B (PVDF-HFP copolymer) |

The irradiated tubing samples and non-irradiated controls were immersed in CE10 fuel at 50° C. and periodically (weekly) inspected for delamination.

The following table summarizes the results of this evaluation:

| Material | Delamination? |
| --- | --- |
| LP-1200 - no irradiation | @ 1 week |
| LP-1200 - 2 MRad | No delamination @ 2 months |

Example 5

A three layer fuel tubing (3/32" ID and 3/16" OD) was subjected to e-beam cross-linking at NEO-beam (Middlefield, Ohio) using a voltage of 4.5 MeV and a beam current of 34 mAmps to achieve a total irradiation of 2 Mrad.

| Jacket (.0374") | Tie-layer (0.002") | Liner (0.011") |
| --- | --- | --- |
| Plasticized PVC | Elastollan C85A (85A polyester based TPU) | KynarFlex 2500 (PVDF-HFP copolymer) |

The irradiated tubing samples and non-irradiated controls were immersed in CE10 fuel at 50° C. and periodically (weekly) inspected for delamination. The results are summarized below

| Material | Delamination? |
| --- | --- |
| PVC/TPU/PVDF - no irradiation | @ 1 week |
| PVC/TPU/PVDF - 2 Mrad | No delamination @ 2 months |

In other aspects, the disclosure provides the following non-limiting embodiments, which can be combined in any logically and technically-consistent manner.

Embodiment 1

A length of tubing having an annular cross-section, the annular cross-section having an inner surface and an outer surface, the annular cross-section comprising:
  an annular fluoropolymer layer formed from at least 75 wt % fluoropolymer (e.g., at least 75 wt % of a PVDF polymer), the fluoropolymer layer having an outer surface and an inner surface; and
  disposed about the fluoropolymer layer, an annular thermoplastic layer formed from at least 75 wt % thermoplastic, the thermoplastic layer having an inner surface in contact with the outer surface of the fluoropolymer layer and an outer surface, wherein the fluoropolymer layer is covalently bound to the thermoplastic layer.

Embodiment 2

The length of tubing according to embodiment 1, wherein the fluoropolymer layer is formed from at least 95 wt % fluoropolymer (e.g., at least 95 wt % of a PVDF polymer).

Embodiment 3

The length of tubing according to embodiment 1, wherein the fluoropolymer layer consists essentially of fluoropolymer (e.g., a PVDF polymer).

Embodiment 4

The length of tubing according to any of embodiments 1-3, wherein the fluoropolymer of the fluoropolymer layer is selected from a PVDF polymer, a FEP polymer, a PEA polymer, an ETFE polymer, an ECTFE polymer, a PCTFE polymer, a THV polymer, or a combination or copolymer thereof.

Embodiment 5

The length of tubing according to any of embodiments 1-4, wherein the fluoropolymer layer has a thickness in the range of 0.1 mm to 10 mm.

Embodiment 6

The length of tubing according to any of embodiments 1-5, wherein the thermoplastic layer is formed from at least 95 wt % thermoplastic.

Embodiment 7

The length of tubing according to any of embodiments 1-5, wherein the thermoplastic layer consists essentially of thermoplastic.

Embodiment 8

The length of tubing according to any of embodiments 1-7, wherein the thermoplastic is thermoplastic polyurethane (e.g., a thermoplastic polyurethane elastomer), thermoplastic polyester (e.g., a thermoplastic polyester elastomer), and/or thermoplastic polyamide (e.g., a thermoplastic polyamide elastomer).

Embodiment 9

The length of tubing according to any of embodiments 1-7, wherein the thermoplastic includes (or is) thermoplastic polyurethane (e.g., thermoplastic polyurethane elastomer).

Embodiment 10

The length of tubing according to embodiment 8 or embodiment 9, wherein the thermoplastic layer is at least 75 wt % thermoplastic polyurethane, e.g., at least 95 wt % thermoplastic polyurethane.

Embodiment 11

The length of tubing according to embodiment 9, wherein the thermoplastic polyurethane of the thermoplastic layer is a polyether-type thermoplastic polyurethane, a polyester-type thermoplastic polyurethane, or a combination or copolymer thereof.

Embodiment 12

The length of tubing according to embodiment 9, wherein the thermoplastic polyurethane of the thermoplastic layer is a polyether-type polyurethane.

Embodiment 13

The length of tubing according to any of embodiments 1-12, wherein the thermoplastic includes (or is) thermoplastic polyester (e.g., thermoplastic polyester elastomer).

Embodiment 14

The length of tubing according to embodiment 13, wherein the thermoplastic layer is at least 75 wt % thermoplastic polyester, e.g., at least 95 wt % thermoplastic polyester.

Embodiment 15

The length of tubing according to any of embodiments 1-14, wherein the thermoplastic includes (or is) thermoplastic polyamide (e.g., thermoplastic polyamide elastomer).

Embodiment 16

The length of tubing according to embodiment 15, wherein the thermoplastic layer is at least 75 wt % thermoplastic polyamide, e.g., at least 95 wt % thermoplastic polyamide.

Embodiment 17

The length of tubing according to any of embodiments 1-16, wherein the thermoplastic of the thermoplastic layer has a Shore A hardness in the range of 50 to 95.

Embodiment 18

The length of tubing according to any of embodiments 1-17, wherein the thermoplastic of the thermoplastic layer has a Shore A hardness in the range of 50-80, e.g., 50-78, or 50-75, or 50-70.

Embodiment 19

The length of tubing according to any of embodiments 1-18, wherein the thermoplastic layer has a thickness in the range of 0.5 mm to 20 mm.

Embodiment 20

The length of tubing according to any of embodiments 1-19, wherein the inner surface of the fluoropolymer layer forms the inner surface of the tubing.

Embodiment 21

The length of tubing according to any of embodiments 1-20, wherein the annular cross-section further comprises one or more inner annular polymer layers disposed on the inside surface of the fluoropolymer layer.

Embodiment 22

The length of tubing according to any of embodiments 1-21, wherein the outer surface of the thermoplastic layer forms the outer surface of the tubing.

Embodiment 23

The length of tubing according to any of embodiments 1-22, further comprising one or more outer annular polymer layers disposed on the outside surface of the thermoplastic layer.

Embodiment

The length of tubing according to any of embodiments 1-23, further comprising a poly(vinyl chloride) layer disposed on the outside surface of the thermoplastic layer.

Embodiment 25

The length of tubing according to any of embodiments 1-24, having a length of at least 1 m, e.g., at least 2 m.

Embodiment 26

The length of flexible tubing according to any of embodiments 1-25, having an inner diameter in the range of 0.5 mm to 40 mm.

Embodiment 27

The length of flexible tubing according to any of embodiments 1-26, having a total wall thickness in the range of 0.5 mm to 25 mm.

Embodiment 28

The length of flexible tubing according to any of embodiments 1-27, wherein the covalent bonding of the fluoropolymer layer to the thermoplastic layer is affected by treatment with an electron beam.

Embodiment 29

The length of flexible tubing according to any of embodiments 1-28, wherein covalent bonding of the fluoropolymer layer to the thermoplastic layer is through a plurality of >CH— moieties and/or >CF— moieties of the fluoropolymer.

Embodiment 30

The length of flexible tubing according to any of embodiments 1-29, wherein covalent bonding of the fluoropolymer layer to the thermoplastic layer is through a plurality of >CH— moieties and/or >CF— moieties of the fluoropolymer to a plurality of >CH— moieties of soft segments of the thermoplastic.

Embodiment 31

The length of flexible tubing according to any of embodiments 1-30, wherein the length of tubing does not exhibit substantial delamination when immersed in CE10 fuel at 40° C. for three months.

Embodiment 32

The length of flexible tubing according to any of embodiments 1-31, wherein the length of tubing is at least four times as resistant to lamination as an equivalent tubing lacking covalent bonds between the fluoropolymer layer and the thermoplastic layer.

Embodiment 33

A method for making a length of flexible tubing, e.g., according to any of embodiments 1-32, comprising:
  providing a length of tubing having an annular cross-section, the annular cross-section having an inner surface and an outer surface, the annular cross-section comprising:
    an annular fluoropolymer layer formed from at least 75 wt % fluoropolymer (e.g., at least 75 wt % of a PVDF polymer), the fluoropolymer layer having an outer surface and an inner surface; and
    disposed about the annular fluoropolymer layer, an annular thermoplastic layer formed from at least 75 wt % thermoplastic, the thermoplastic layer having an inner surface in contact with the outer surface of the fluoropolymer layer; and
  treating the length of tubing with an electron beam.

Embodiment 34

The method according to embodiment 33, wherein the treatment with the electron beam is performed with a dose of at least 1 Mrad.

Embodiment 35

The method according to embodiment 33, wherein the treatment with the electron beam is performed with a dose of at least 5 Mrad.

Embodiment 36

The method according to embodiment 33, wherein the treatment with the electron beam is performed with a dose of at least 9 Mrad.

Embodiment 37

The method according to embodiment 33, wherein the treatment with the electron beam is performed with a dose in the range of 1 Mrad to 50 Mrad, e.g., 5 Mrad to 50 Mrad, or 9 Mrad to 50 Mrad, or 13 Mrad to 50 Mrad, or 1 Mrad to 30 Mrad, or 5 Mrad to 30 Mrad, or 9 Mrad to 30 Mrad, or 13 Mrad to 30 Mrad, or 1 Mrad to 20 Mrad, or 5 Mrad to 20 Mrad, or 9 Mrad to 20 Mrad, or 13 Mrad to 20 Mrad, or 9 Mrad to 17 Mrad.

Embodiment 38

The method according to any of embodiments 33-37, wherein the energy of the electron beam is at least 1 MeV, e.g., in the range of 1-20 MeV.

Embodiment 39

The method according to any of embodiments 33-38, wherein the length of tubing is formed by co-extruding the fluoropolymer layer with the thermoplastic polyurethane layer.

Embodiment 40

The method according to any of embodiments 33-39, wherein the treatment with the electron beam forms covalent bonds between the fluoropolymer layer and the thermoplastic layer.

Embodiment 41

A length of tubing of any of embodiments 1-32, made according to the method according to any of embodiments 33-40.

Embodiment 42

A length of tubing made according to the method according to any of embodiments 33-40.

Embodiment 43

A method for transporting a hydrocarbon fuel, comprising providing a length of tubing according to any of embodiments 1-32, 41 and 42; and flowing the hydrocarbon fuel through the flexible tubing from a first end to a second end thereof.

Embodiment 44

A fuel-powered device comprising a fuel tank, a fuel-powered engine, and a length of tubing according to any of embodiments 1-32, 41 and 42 fluidly connecting the fuel tank with the fuel-powered engine.

Embodiment 45

The fuel-powered device of embodiment 44, in the form of an automobile.

Embodiment 46

The fuel-powered device of embodiment 44, in the form of a non-automotive device, such as a motorcycle, a 4-wheel or other recreational vehicles, a lawn tractor, a string trimmer, a leafblower, a snowblower, a lawnmower, a tiller, or a chain saw.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

What is claimed is:

1. A length of tubing having an annular cross-section, the annular cross-section having an inner surface and an outer surface, the annular cross-section comprising:
    an annular fluoropolymer layer formed from at least 90 wt % fluoropolymer, the fluoropolymer layer having an outer surface and an inner surface; and
    disposed about the fluoropolymer layer, an annular thermoplastic layer formed from at least 75 wt % of one or more of thermoplastic polyurethane, thermoplastic polyester and thermoplastic polyamide, the thermoplastic layer having an inner surface in contact with the outer surface of the fluoropolymer layer and an outer surface,
wherein the fluoropolymer layer is directly covalently bound to the thermoplastic layer.

2. The length of tubing according to claim 1, wherein the fluoropolymer of the fluoropolymer layer is selected from a PVDF polymer, a FEP polymer, a PEA polymer, an ETFE polymer, an ECTFE polymer, a PCTFE polymer, a THV polymer, or a combination or copolymer thereof.

3. The length of tubing according to claim 1, wherein the fluoropolymer layer has a thickness in the range of 0.1 mm to 10 mm.

4. The length of tubing according to claim 1, wherein the thermoplastic includes thermoplastic polyurethane.

5. The length of tubing according to claim 4, wherein the thermoplastic polyurethane of the thermoplastic layer is a polyether-type polyurethane.

6. The length of tubing according to claim 1, wherein the thermoplastic includes thermoplastic polyester.

7. The length of tubing according to claim 1, wherein the thermoplastic includes thermoplastic polyamide.

8. The length of tubing according to claim 1, wherein the thermoplastic of the thermoplastic layer has a Shore A hardness in the range of 50 to 95.

9. The length of tubing according to claim 1, wherein the thermoplastic layer has a thickness in the range of 0.5 mm to 20 mm.

10. The length of tubing according to claim 1, wherein the inner surface of the fluoropolymer layer forms the inner surface of the tubing.

11. The length of tubing according to claim 1, wherein the annular cross-section further comprises one or more inner annular polymer layers disposed on the inner surface of the fluoropolymer layer.

12. The length of tubing according to claim 1, wherein the outer surface of the thermoplastic layer forms the outer surface of the tubing.

13. The length of tubing according to claim 1, further comprising one or more outer annular polymer layers disposed on the outer surface of the thermoplastic layer.

14. The length of tubing according to claim 1, having a length of at least 1 m.

15. The length of flexible tubing according to claim 1, wherein covalent bonding of the fluoropolymer layer to the thermoplastic layer is through a plurality of >CH— moieties and/or >CF— moieties of the fluoropolymer to a plurality of >CH— moieties of soft segments of the thermoplastic layer, thereby forming >CH—HC<bonds and/or >CF—HC<bonds.

16. The length of flexible tubing according to claim 1, wherein the length of tubing does not exhibit delamination when immersed in CE10 fuel at 40° C. for three months.

17. A method for making a length of flexible tubing according to claim 1, comprising:
    providing a length of tubing having an annular cross-section, the annular cross-section having an inner surface and an outer surface, the annular cross-section comprising:
        an annular fluoropolymer layer formed from at least 90 wt % fluoropolymer, the fluoropolymer layer having an outer surface and an inner surface; and
        disposed about the annular fluoropolymer layer, an annular thermoplastic layer formed from at least 75 wt % of one or more of thermoplastic polyurethane, thermoplastic polyester and thermoplastic polyamide, the thermoplastic layer having an inner surface in contact with the outer surface of the fluoropolymer layer; and
    treating the length of tubing with an electron beam.

18. The method according to claim 17, wherein the treatment with the electron beam is performed with a dose of at least 1 Mrad.

19. A method for transporting a hydrocarbon fuel, comprising
    providing a length of tubing according to claim 1; and
    flowing the hydrocarbon fuel through the flexible tubing from a first end to a second end thereof.

20. A fuel-powered device comprising a fuel tank, a fuel-powered engine, and a length of tubing according to claim 1 fluidly connecting the fuel tank with the fuel-powered engine.

21. The length of tubing according to claim 1, wherein the fluoropolymer layer is a layer of a polymer or copolymer of PVDF.

22. The length of tubing according to claim 21, wherein the thermoplastic layer is a layer of polyether-type polyurethane.

* * * * *